March 1, 1938. E. W. SMITH 2,109,912
METHOD FOR TREATING MILK
Filed April 4, 1935
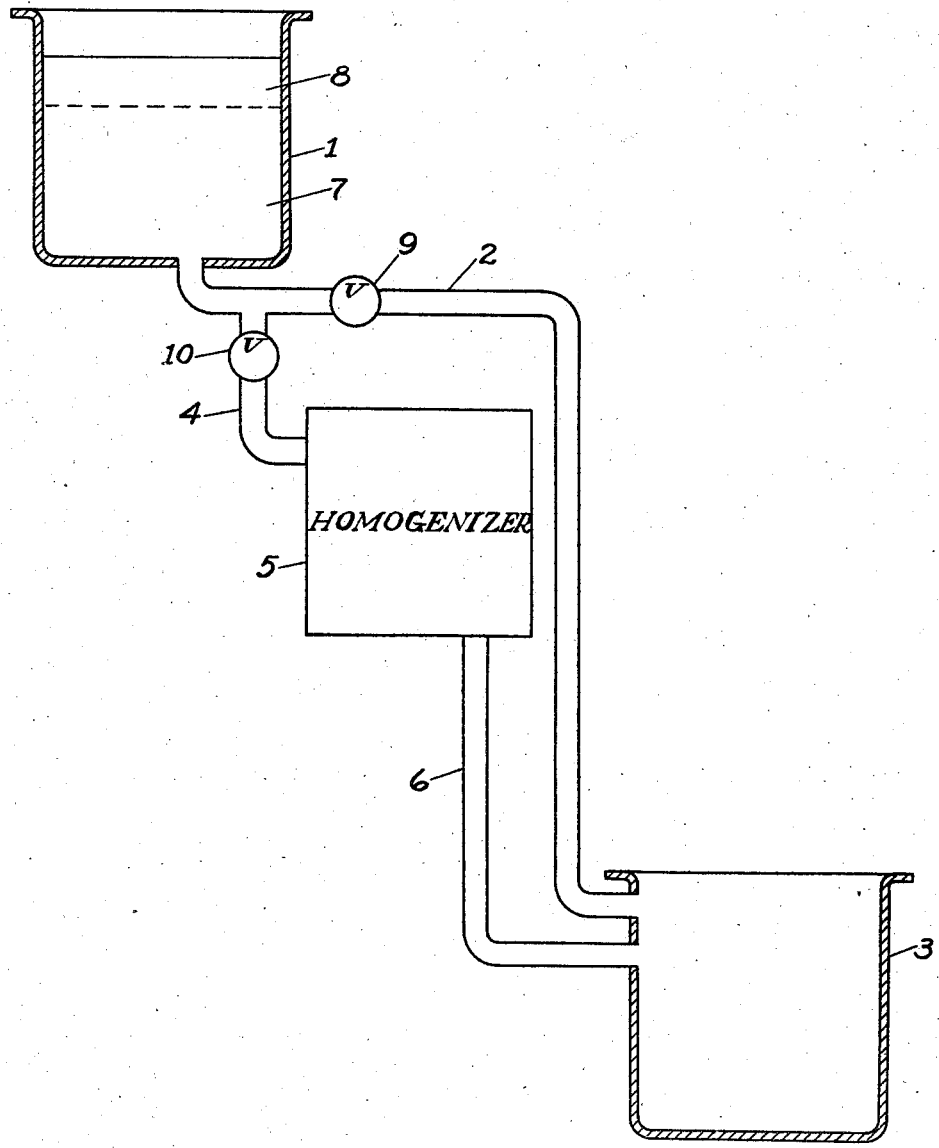
INVENTOR.
EDWARD W. SMITH
BY
ATTORNEY.

Patented Mar. 1, 1938

2,109,912

UNITED STATES PATENT OFFICE 2,109,912

METHOD FOR TREATING MILK

Edward W. Smith, Melrose, Mass., assignor to Submarine Signal Company, Boston, Mass., a corporation of Maine Application April 4, 1935, Serial No. 14,643

10 Claims. (Cl. 99—60)

The present invention relates to a process for the treatment of milk, particularly to reduce the curd tension thereof.

The digestibility of milk is dependent in a large measure upon the toughness of the curd which is formed in the stomach when the milk is acted upon by the stomach secretions. Some milk naturally forms a soft curd and other milk a hard curd. It is particularly desirable that infants and convalescents be given a milk which forms a soft curd in order that it may be easily digested.

Cow's milk in general has a relatively high curd tension but this varies with different cows and apparently also with the season and other factors. Consequently it is difficult to provide soft-curd milk in quantities. The curd tension of milk can be reduced by boiling the milk, but this is objectionable because of changes which are produced in the milk.

Another method of reducing the curd tension of milk which has been proposed is to pass the milk through a pressure homogenizer. This, however, brings about a homogenization of the butter fat in the milk so that the cream will no longer rise but remains permanently dispersed.

A still further method of reducing the curd tension of milk is described in the copending application, Serial No. 756,504, of Leslie A. Chambers, filed December 7, 1934, now Patent No. 2,091,267, issued August 31, 1937. The method described in this application comprises subjecting the whole milk to the action of intense compressional wave energy. With the apparatus described in the above application it is possible to bring about a reduction of the curd tension of the milk without producing homogenization of the cream, but it appears that this requires careful adjustments of the apparatus which are difficult to maintain under commercial operating conditions.

Now, I have discovered that the reduction of the curd tension is involved in some manner with the dispersion of very small quantities of fat particles in the milk. Thus, a reduction of the curd tension of skim milk can only be brought about with homogenizing apparatus, such as a pressure homogenizer or a compressional-wave homogenizer of the kind described in the copending application above referred to or the dispersion apparatus described in United States Patent No. 1,992,938, by introducing into the skim milk a small quantity of fat. The quantity need not be more than one-half of one percent.

If no butter fat is present at all in skim milk, it appears to be impossible to obtain any reduction in the curd tension. As more and more butter fat is added, better and better results are obtained. The presence of more than approximately one-half of one percent of butter fat does not, however, assist in obtaining any lower curd tensions, but merely results in dispersing the additional cream in the milk. The presence of the above amount of butter fat is, therefore, ample to reduce the curd tension of milk to less than 25 grams, which is generally regarded as the maximum for soft curd milk.

According to my method of bringing about a reduction of the curd tension of whole milk, the butter fat or cream is first separated from the milk in some suitable manner as by means of a cream separator or by allowing the milk to stand a short period of time, say four or five hours, in a settling tank. The skim milk, still containing or having had added thereto a small quantity of butter fat in an amount of the order of one-half of one percent of the total weight of liquid, is then passed through the homogenizing apparatus whereby a reduction in the curd tension is brought about. The initially removed cream is then again added to the treated skim milk. In this way the resulting milk is the same as it was before treatment with the exception of the fact that the curd tension has been reduced. The cream is still in an undispersed state, the fat particles being large enough so that they will rise in the usual manner, no destruction of the cream line being evident.

The preservation of the cream in an undivided state is particularly desirable for several reasons. For some purposes, for example, for infant feeding, it is often essential that only a very small amount of butter fat be present. By employing my method, the cream may be removed from the skim milk either before or after treatment. On the other hand, where the milk is sold for general household use, the amount of cream present can readily be detected by allowing it to rise and can be removed by the householder for separate use if desired. These advantages which are obtained by means of the present invention are, of course, wholly lost in any system where the cream is broken up into such small particles that it will no longer rise but remains permanently dispersed in the body of the milk.

By following my method no undesirable interference with standard dairy practice will occur even though all the milk passing through the plant be treated for curd-tension reduction. The treatment of the milk in accordance with my method may readily be arranged to be introduced into the regular dairy routine either just before or just after the milk passes through the pasteurizing apparatus. For example, before pasteurizing, the milk may be placed in a settling tank. The skim milk may then be piped directly to the homogenizer whose output end may be connected by pipes to a mixing tank. After the skim milk has substantially all been drawn off the bottom of the settling tank, leaving only the cream, a valve in the pipe connecting the tank to the homogenizer may be closed and a second valve opened in a pipe connecting the settling tank to the mixing chamber in which the cream is again mixed with the treated skim milk. In this case the mixing chamber may conveniently be the tank of the pasteurizer.

An arrangement for carrying out the above method in a dairy is schematically shown in the drawing. The settling tank is shown at 1 and is connected by the pipe 2 directly to the mixing chamber 3. A second pipe 4 leads to the homogenizing apparatus 5 which is preferably a compressional wave device but may be a pressure homogenizer. The output of the latter leads by means of pipe 6 to the mixing chamber 3. The latter may, if desired, be the pasteurizing tank. The valve 9 is provided for closing the pipe 2 and a valve 10 for closing the pipe 4. The whole milk, after having been allowed to stand in the tank 1 for several hours will have separated into skim milk represented at 7 and cream represented at 8.

The valve 10 may then be opened allowing the skim milk to flow through the homogenizer and thence into the tank 3. When the skim milk has all been drawn off from the tank 1, the valve 10 is closed and the valve 9 opened, allowing the cream to pass directly through the pipe 2 to the tank 3 where it is again mixed with the skim milk.

It will be obvious that when whole milk is not available, skim milk containing, or having had added thereto, a small amount of butter fat, say of the order of one-half of one percent, may be treated by the dispersing apparatus and sufficient cream may then be added to bring the resulting product up to the desired degree of butter-fat content.

Having now described my invention, I claim:

1. The method of treating whole milk which comprises separating the greater part of the cream from the milk, causing the skim milk to be homogenized and thereby reducing its curd tension and subsequently adding to the treated skim milk the cream which was initially removed.

2. The process of treating whole milk which comprises removing all but a small quantity of the butter fat leaving only an amount of the order of one-half of one percent of the weight of the skim milk, subjecting the resultant skim milk to homogenizing action, thereby reducing its curd tension, and subsequently adding to the treated product the butter fat which was originally removed.

3. The process of producing milk with a low curd tension which comprises subjecting skim milk having approximately one-half of one percent of butter fat to homogenizing action and adding cream to bring the milk to the desired butter-fat content.

4. The process of treating whole milk which comprises separating all but a small quantity of the cream leaving only an amount of the order of one-half of one percent of butter fat in the resulting skim milk, passing the latter through a compressional wave homogenizer and thereby reducing its curd tension and subsequently adding to the treated skim milk the cream which was initially removed.

5. The method of treating whole milk which comprises separating the greater part of the cream from the milk, effecting homogenization of the cream remaining in the milk and thereby reducing the curd tension of the latter and subsequently adding to the treated milk the cream which was initially removed.

6. The method of treating whole milk which comprises separating the greater part of the cream from the milk, subjecting the skim milk thereby obtained to compressional wave homogenization and thereby reducing its curd tension and subsequently adding to the skim milk so treated the cream which was initially removed.

7. The method of treating whole milk which comprises allowing an amount of cream of an order of substantially one-half of one percent of butter fat to remain in the milk, subjecting the milk after the removal of the cream to compressional wave homogenization and thereby reducing its curd tension and subsequently adding to the treated milk cream in such quantities as to preserve the desired cream line.

8. The method of treating whole milk which comprises allowing an amount of cream to remain in the milk substantially equal to one-half of one percent of butter fat, effecting a homogenization of the milk so treated and thereby reducing its curd tension and subsequently adding to the treated milk cream in such quantities as to attain the desired cream line.

9. The method of treating whole milk which comprises allowing the greater part of the cream to rise on top of the milk, subjecting the milk to compressional wave homogenization and thereby reducing its curd tension and subsequently combining the milk and cream.

10. The method of treating whole milk which comprises effecting a removal of the greater part of the cream, subjecting the remaining milk to compressional wave homogenization and thereby reducing its curd tension and subsequently combining the milk and cream.

EDWARD W. SMITH.